United States Patent [19]

Vaughan

[11] Patent Number: 5,224,797
[45] Date of Patent: Jul. 6, 1993

[54] APPARATUS FOR LAYING POROUS IRRIGATION PIPE, CABLE, CONDUIT, AND THE LIKE

[76] Inventor: Donald R. Vaughan, 12 Third St., Woodland, Calif. 94595

[21] Appl. No.: 789,050

[22] Filed: Nov. 7, 1991

[51] Int. Cl.⁵ .............................................. E02F 5/10
[52] U.S. Cl. .................................. 405/180; 405/174; 37/350; 37/92
[58] Field of Search ........ 405/154, 174, 176, 180–183; 37/80 R, 81, 91, 92, 189; 299/39

[56] References Cited

U.S. PATENT DOCUMENTS

| | | | |
|---|---|---|---|
| 1,544,409 | 6/1925 | Johnson | 37/80 R |
| 2,054,129 | 9/1936 | Kelsey | 37/189 |
| 2,196,513 | 4/1940 | Adler | 37/189 |
| 3,354,660 | 11/1967 | Vaughan | 405/174 |
| 3,930,324 | 1/1976 | Wightman et al. | 37/189 |
| 5,007,685 | 4/1991 | Beach et al. | 37/91 X |

FOREIGN PATENT DOCUMENTS

| | | | |
|---|---|---|---|
| 849132 | 9/1952 | Fed. Rep. of Germany | 405/183 |
| 2517478 | 7/1976 | Fed. Rep. of Germany | 37/189 |
| 720099 | 3/1980 | U.S.S.R. | 405/180 |

Primary Examiner—Dennis L. Taylor
Assistant Examiner—John Ricci
Attorney, Agent, or Firm—Julian Caplan

[57] ABSTRACT

A rotatable apparatus for placing lengths of flexible pipe and cable a distance beneath the surface of the ground leaving the soil substantially intact. The pipe laying apparatus includes a shaft having an exterior, a plurality of cutting bits removably mounted on the shaft and a device for securing the cutting bits on the shaft. The cutting bits each have a base, a tool bit, and an attachment device to prevent any rotation by the cutting bits relative to the shaft. The tool bits have a leading cutting edge, a cutting surface extending from the leading cutting edge, and an inclined surface separating the cutting surface and the base. As the shaft rotates, the leading cutting edge and the cutting surface cut through the soil and push it in towards the inclined surface, which in turn displaces the soil in an axial direction. The pipe laying apparatus also includes a plurality of spacers removably mounted to the shaft separating the cutting bits. The attachment device includes at least one non-circular configuration in the base and a complementary non-circular configuration in the shaft.

13 Claims, 3 Drawing Sheets

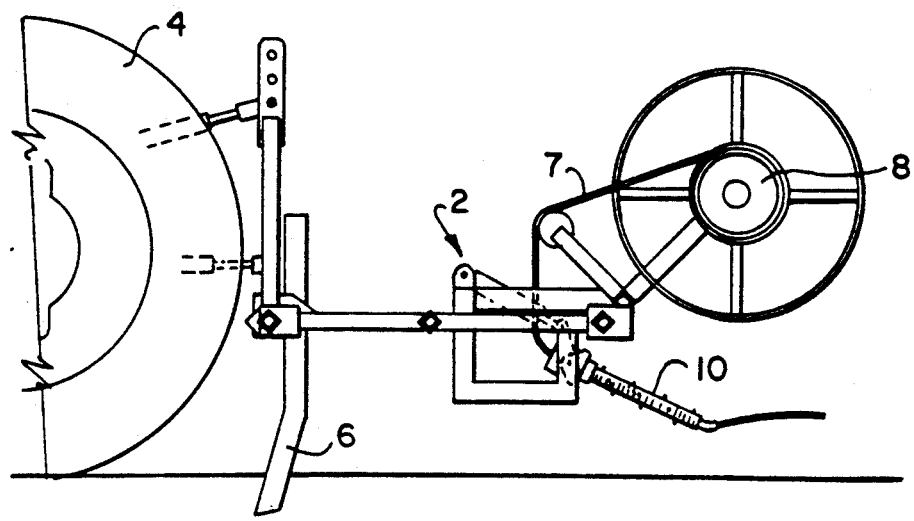
FIG. 1
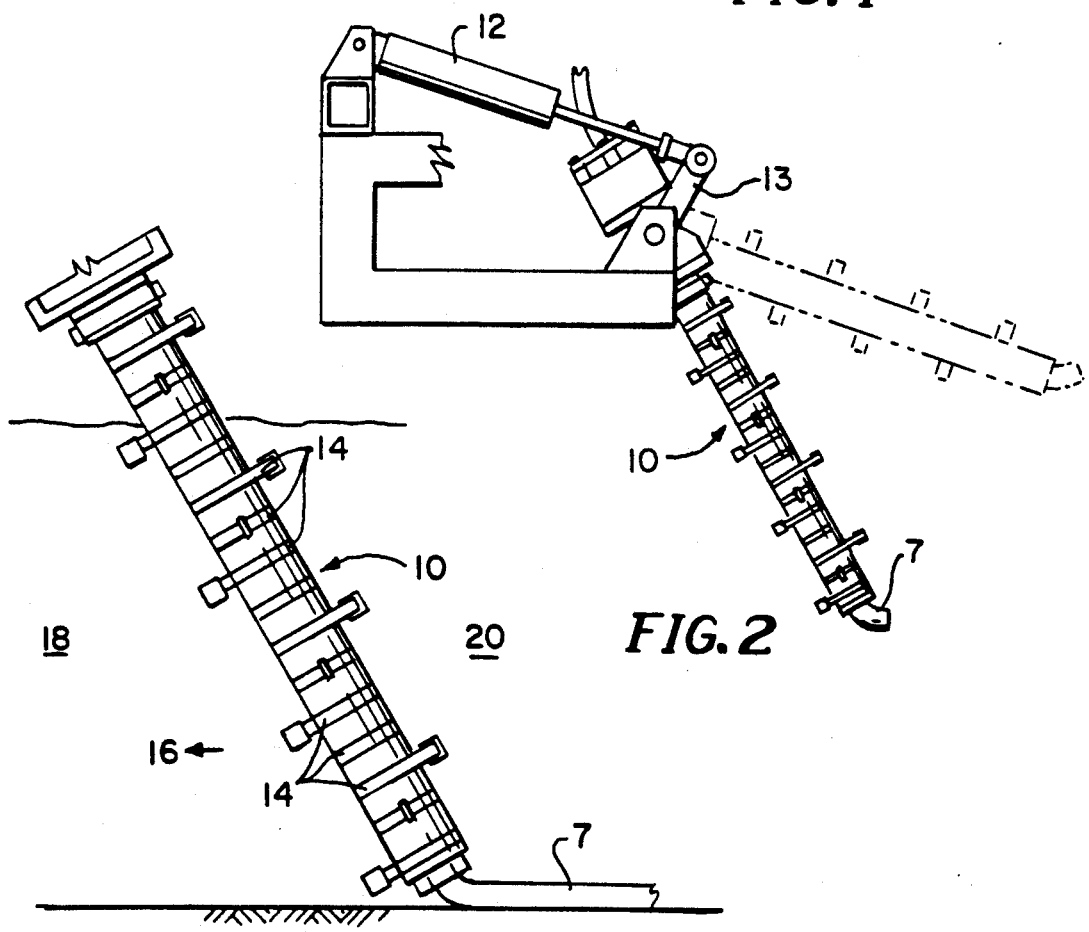
FIG. 2
FIG. 3

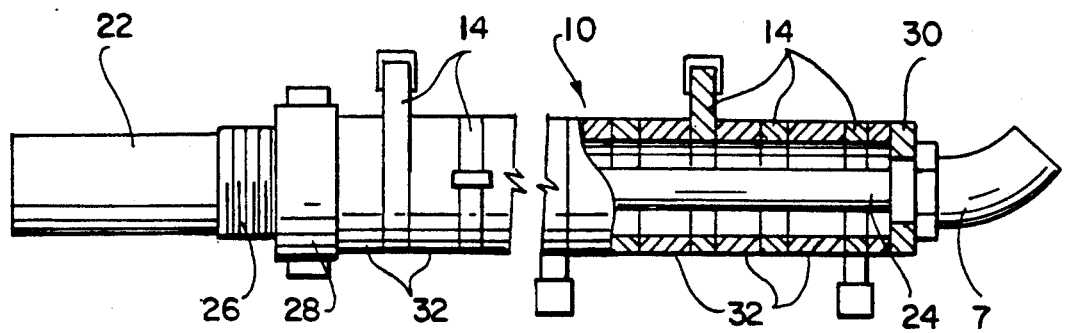
FIG. 4
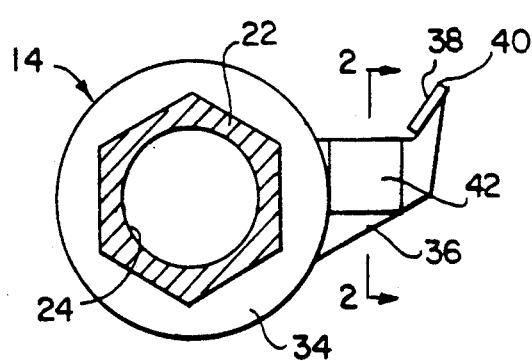
FIG. 5     FIG. 6
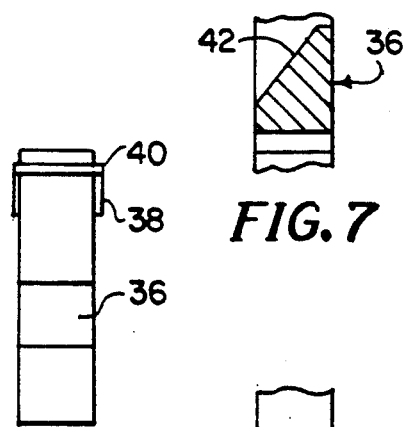
FIG. 7
FIG. 7A
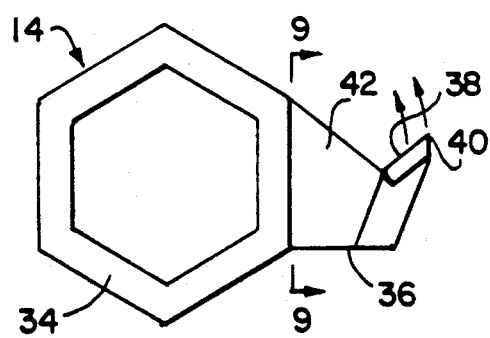
FIG. 8
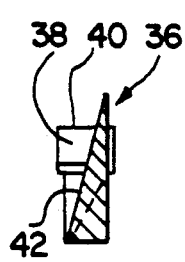
FIG. 9
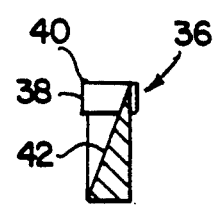
FIG. 10

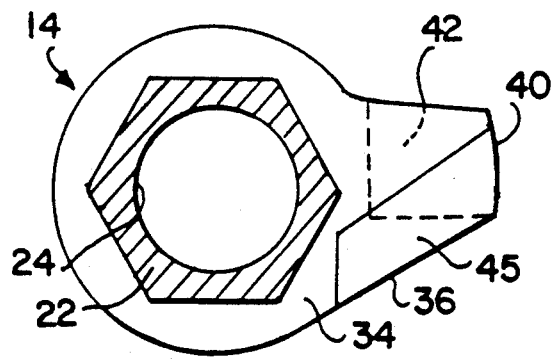
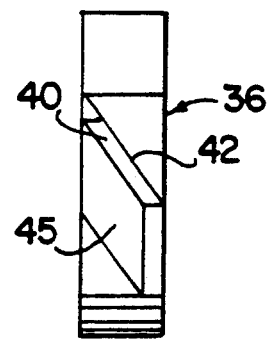
FIG. 11  FIG. 12
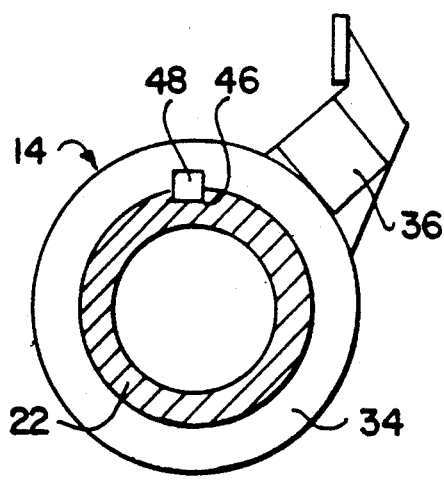
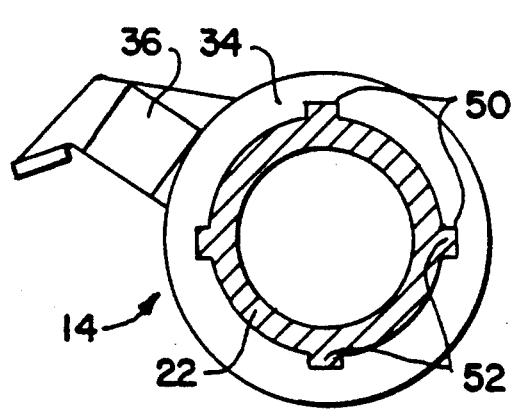
FIG. 13  FIG. 14

APPARATUS FOR LAYING POROUS IRRIGATION PIPE, CABLE, CONDUIT, AND THE LIKE

BACKGROUND OF THE INVENTION

Field of the Invention

Technical Field

In general, the present invention relates to cable laying devices for depositing flexible pipe, cables, and the like beneath the surface of the ground without creating a trench. More particularly, the present invention relates to a pipe laying apparatus for placing flexible pipe and cable below the surface of the ground and then compacting soil disturbed by the passage of the apparatus.

BACKGROUND OF THE INVENTION

Cable laying devices for the laying of flexible pipe, cable, and the like without first forming a trench operate by cutting through the soil in a substantially helical cutting path and laying the conduit a distance beneath the ground without actually removing the earth. One example of such a device is shown in the U.S. Pat. No. 3,354,660 to D. Vaughan.

Porous pipe systems such as by Aquapore Moisture Systems and Leaky Pipe by Entek Corporation provide a uniform amount of moisture to the earth surrounding the pipe. Water diffuses through the wall of the pipe, passing through the soil by capillary action. To achieve the proper moisture level, the soil must be sufficiently packed down around the pipe for the water to be absorbed by the surrounding soil. Otherwise, water diffusing from the pipe travels along the exterior surface and collects at different points, forming puddles along the length of pipe. Instead of an even moisture distribution, the resulting effect is patches of dry and saturated soil.

Laying porous pipe with a cable laying device of the prior art allows the system to be installed without digging a trench. Even without creating a trench, the prior art agitator leaves a path of disturbed earth as it cuts through and loosens the undisturbed soil. After the passage of almost a year, the disturbed soil is completely packed down, becoming undisturbed earth once again. A porous pipe system will not function properly in disturbed soil, while undisturbed soil is sufficiently packed for capillary action.

The natural compaction process may be assisted by driving a tractor or other heavy machinery over the area of disturbed soil and watering the area using an above ground sprinkling system. By using these means to quicken the process, the disturbed soil will still not be adequately compacted for several months.

The long delay after laying porous pipe before the system may be efficiently used discourages many from switching from alternative styles of irrigation to the water-conserving porous pipe system. The known methods of assisting the soil compaction waste time, labor and resources. Therefore, a need exists for a pipe laying device which compacts the disturbed soil while laying the pipe.

The quality and the moisture level of the soil often determine the length of time required before the soil has returned to an undisturbed state. For example, damp soil compacts faster than dry, and fine soil compacts faster than coarse. For maximum usefulness, a pipe laying device which compacts the soil should be capable of applying different degrees, or different densities of compaction to the soil as the apparatus passes through the earth.

The actual density of compaction required is often not correctly determined until a pipe laying apparatus has begun laying the conduit in the field. The soil may contain a higher level of moisture than predicted, for example. Thus, a pipe laying apparatus which allows the compaction density to be easily modified in the field is highly desirable.

While the advantages of the present invention are most clearly noticeable when applied to laying porous pipe, the benefits are not limited to this medium. A pipe laying apparatus for laying utility cables, conduits and the like is desirable for reducing the amount of soil disturbance caused when placing the cable underground.

Accordingly, a primary object of the present invention is to provide a cable and pipe laying apparatus which sequentially cuts undisturbed soil, lays the cable or pipe, and compacts disturbed soil.

Another object of the present invention is to provide a cable and pipe laying apparatus which is capable of applying differing densities of compaction to the disturbed soil.

A further object of the present invention is to provide a cable and pipe laying apparatus in which the compaction density provided may be conveniently changed in the field.

A more general object of the present invention is to provide a cable and pipe laying apparatus which minimizes the disturbance to the soil as the cable and pipe are placed underground.

The apparatus of the present invention has other objects and features of advantage which will become apparent from and are set forth in more detail in the Detailed Description of the Invention.

SUMMARY OF THE INVENTION

The pipe laying apparatus of the present invention for the laying of pipe or cable without creating a trench includes a rotatable hollow shaft. A plurality of cutting bits are removably mounted on the shaft. Each cutting bit has a base with a projecting tool bit. The tool bits have a cutting edge, a cutting surface extending from the leading edge, and an inclined surface separating the cutting surface from the base. An attachment device secures the base to shaft, preventing the rotation of the cutting bit relative to the shaft. The apparatus also includes a device securing the cutting bits onto the shaft for operation.

In the preferred embodiment, the cutting bits are separated from each other by a number of spacers removably mounted on the shaft. The base has at least one non-circular configuration, and the shaft has a complementary non-circular configuration. The cooperating non-circular configurations act together to attach the cutting bits to the shaft to prevent any rotation relative to the shaft.

BRIEF DESCRIPTION OF THE DRAWINGS

The accompanying drawings, which are incorporated in and form a part of this specification, illustrate embodiments of the invention and, together with the description, serve to explain the principles of the invention:

Additional objects and features of the present invention will be more apparent from the following detailed description and the appended claims, when taken in conjunction with the drawings in which:

FIG. 1 is a side elevational view of a pipe laying apparatus constructed in accordance with the present invention, shown mounted to a cable laying device attached to a tractor.

FIG. 2 is a side elevational view of a pipe laying apparatus constructed in accordance with the present invention shown in both a lowered and a raised position.

FIG. 3 is a side elevational view of a pipe laying apparatus constructed in accordance with the present invention shown in operation.

FIG. 4 is a pipe laying apparatus constructed in accordance with the present invention shown partially in cross section, FIG. 5 is a frontal view of a cutting bit for a pipe laying apparatus constructed in accordance with the present invention.

FIG. 6 is a side view of the cutting bit depicted in FIG. 5.

FIG. 7 is a sectional view taken along line 7—7 of FIG. 5.

FIG. 7A is sectional view of a modification of the cutting bit shown in FIG. 5, showing the same portion of the cutting bit as in FIG. 7.

FIG. 8 is a frontal view of an alternative embodiment of a cutting bit for a pipe laying apparatus constructed in accordance with the present invention.

FIG. 9 is a sectional view taken along line 9—9 of FIG. 8.

FIG. 10 is a sectional view of a modification of the cutting bit shown in FIG. 8, showing the same portion of the cutting bit as in FIG. 9.

FIG. 11 is a frontal view of an additional embodiment of a cutting bit for a pipe laying apparatus constructed in accordance with the present invention.

FIG. 12 is a side view of the cutting bit depicted in FIG. 11.

FIG. 13 is an alternative embodiment of a cutting bit having a modified base for a pipe laying apparatus designed in accordance with the present invention.

FIG. 14 is an additional alternative embodiment of a cutting bit having a modified base for a pipe laying apparatus designed in accordance with the present invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Reference will now be made in detail to the preferred embodiments of the invention, which are illustrated in the accompanying Figures. Turning now to the drawings, wherein like components are designated by like reference numerals throughout the various figures, attention is directed to FIG. 1.

A cable laying device 2 for placing flexible pipe or cable underground is shown in FIG. 1 mounted to a tractor 4. A conventional ripper 6 is attached to cable laying device 2 near the rear of tractor 4. A quantity of cable, pipe, or other conduit 7 is loaded on the cable laying device on conventional spool 8, and fed through pipe laying apparatus 10. Alternatively, the cable or pipe may be stretched along the installation path, and passed through the pipe laying apparatus as the tractor moves down the field.

When the tractor progresses in a straight path, the ripper is lowered to slice through the ground, loosening the soil for pipe laying apparatus 10. Loosening the soil reduces the amount of work required by the pipe laying apparatus to cut through the earth. The tractor may move faster, reducing the amount of time required to lay the pipe. Each time the tractor makes a turn, the ripper is raised and the pipe laying apparatus cuts through the soil unaided.

Turning now to FIG. 2, pipe laying apparatus 10 is shown in a raised position by the interrupted lines. When the pipe laying apparatus is not in use, it is moved into a raised position where it remains untouched by the ground as the tractor travels to and from the installation area. By actuating piston and cylinder assembly 12, pivoting arm 13 moves the pipe laying apparatus to a lowered position represented by the solid lines. Pipe laying apparatus 10 is positioned in the ground by either lowering the apparatus into a preformed hole, or by allowing the apparatus to cut through the soil as it moves to the lowered position.

A preferred embodiment of pipe laying apparatus 10 is laying a porous pipe such as that sold by Aquapore Moisture Systems and Entek Corporation under tradenames Aquapore and Leaky Pipe, respectively. It will be understood that cable, other flexible pipes and the like may also be installed with the apparatus. A plurality of cutting bits 14 form a helical cutting path as the pipe laying apparatus rotates about its longitudinal axis and moves transversely in the general direction of arrow 16. As the pipe laying apparatus moves through the soil, the pipe or cable passes through pipe laying apparatus 10 and is held in position underground by the weight of the earth.

The soil in the path of the pipe laying apparatus, designated generally by 18, is undisturbed soil and has not yet been displaced by the cutting action of cutting bits 14. Soil displaced by the cutting bits is disturbed soil. The cutting bits exert an identical cutting force throughout a full rotation of pipe laying apparatus 10. Cutting bits 14 alternatively cut the undisturbed soil and compact the disturbed soil. The soil in the wake of the pipe laying apparatus, generally designated 20, is compacted soil. The compacted soil has a density of compaction capable of supporting capillary transmission of moisture radially and evenly in its entire length of the porous pipe similar to that of the undisturbed soil. Thus, the cable or porous pipe has been laid leaving a minimum amount of disturbed soil.

Turning to FIG. 4, cutting bits 14 are removably mounted onto a shaft 22 of the pipe laying apparatus. Shaft 22 is hexagonal or is otherwise configured so that bits 14, which are of complementary shape, are nonrotatable relative thereto. The shaft has a hollow interior 24 which provides a passageway for the cable or flexible pipe. A portion of the exterior of the shaft contains threads 26. A tightening nut 28 having complementary threads cooperates with the shaft to secure the cutting bits in place. A split ring 30 is mounted on the shaft at the end opposite threads 26, also securing the cutting bits on the shaft.

In the preferred embodiment, tightening nut 28, threaded portion 26 of shaft 22, and split ring 30 are used to hold the cutting bits on the shaft. However, many other means may be used to secure the cutting bits in position on the cutting apparatus.

A plurality of spacers 32 removably mounted on shaft 22 separate cutting bits 14 in the pipe laying apparatus of the preferred embodiment. The spacers provide areas along the length of the pipe laying apparatus where disturbed earth may accumulate for compaction. Alternatively, the spacers may be eliminated, increasing the number of cutting bits fitting onto the shaft.

One embodiment of cutting bit 14 positioned on shaft 22 is represented in FIG. 5-7. The cutting bit has a base 34 and a tool bit 36. A cutting or frontal surface 38 extends from a leading cutting edge 40. The cutting surface is oriented partially facing base 34. An inclined or sloped surface 42 separates the cutting surface from the base.

As the pipe laying apparatus rotates, the leading cutting edge and the cutting surface cut through the earth, directing the disturbed soil towards base 34. Further rotation drives the disturbed soil axially along the inclined surface and into the path of the cutting surface of an adjacent cutting bit.

Depending on the orientation of inclined surface 42, the axial flow will be in one of two directions along the longitudinal axis of the pipe laying apparatus; either up, toward the surface, or down, toward the pipe or cable. The density of compaction is determined by the percentage of axial flow up to axial flow down. The amount of compaction may be controlled by modifying the percentage of upward to downward flow.

A modification of inclined or sloped surface 42 is shown in FIG. 7A. The inclined surface does not extend throughout the width of the cutting bit. Rather, an opposed inclined surface 43 meets inclined surface 42. As the cutting face pushes disturbed soil in towards the base, some is projected in an upward axial direction along incline surface 42, while the remaining soil moves along incline surface 43 in a downward axial direction. The compaction density is determined by the percentage of axial flow along inclined surface 42 and inclined surface 43.

An alternative embodiment of cutting bit 14 is depicted in FIGS. 8-10. Cutting or frontal surface 38 pushes soil disturbed by leading cutting edge 40 towards inclined or sloped surface 42. In this embodiment, the inclined surface extends the full width of the cutting bit. The slope of the inclined surface is smaller than that of the previous embodiment, reducing the amount of axial flow during rotation of the cutting bit. In a modification of this embodiment, shown in FIG. 10, inclined slope 42 has a smaller planar surface.

Yet another embodiment of cutting bit 14 is shown in FIGS. 11 and 12. Inclined surface 42 and rear inclined surface 45 extending from leading cutting edge 40. As the pipe laying apparatus rotates, the soil disturbed by the leading cutting edge moves substantially in an axial direction along either inclined surface 42 or inclined surface 45. The orientation of the inclined surfaces relative to the longitudinal axis of pipe laying apparatus 10 determines the direction of the axial flow.

The compaction density is determined by the number of cutting bits 14 having inclined surfaces 42 facing in the first direction and the number facing in the second direction. Additionally, the previously discussed embodiments of the cutting bits may be combined and mounted on shaft 22 to provide different compaction densities.

As can be seen in each of the three embodiments of cutting bit 14, the inner configuration of the base is hexagonal in shape, while the exterior of shaft 22 has a complementary hexagonal configuration. When the cutting bit is placed on the shaft, the complementary configurations of the base and the exterior of the shaft interlock together to prevent any rotation by cutting bit 14 relative to shaft 22. While a hexagonal shape is depicted, other non-circular configurations may be used in attaching the cutting bits on the shaft.

Two additional means for attaching cutting bits 14 on shaft 22 are shown in FIGS. 13 and 14. In FIG. 13, shaft 22 has a circular exterior and a keyway 46. Base 34 fits around shaft 22 and has a spline 48 which interlocks with keyway 46. The base is thus attached in place and will not rotate relative to the shaft as the pipe laying apparatus cuts through the soil. Alternatively, shaft 22 is shown having a plurality of splines 50 projecting from the exterior. Base 34 is formed with a complementary plurality of keyways 52. When the cutting bit is mounted on the shaft, keyways 52 lock with splines 50 to hold the base in position.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A rotatable pipe laying apparatus for placing lengths of flexible pipe and cable a distance beneath the surface of the ground comprising:
   a hollow shaft having an exterior;
   a plurality of cutting bits removably mounted on said shaft, said cutting bits configured for continuous cutting action throughout a full rotation of said shaft, each of said cutting bits having a base and a tool bit, said base being formed with an aperture to slip over said shaft, said tool bit extending outward from said base, attachment means to removably secure said base to said shaft to prevent rotation of said base about said shaft, said tool bit having a leading cutting edge, a cutting surface extending from said leading edge, and an inclined surface separating said cutting edge and said base; and
   means for securing said cutting bits on said shaft.

2. The apparatus of claim 1 wherein said attachment means comprises at least one non-circular configuration in said aperture and a complementary non-circular configuration in said shaft.

3. The apparatus of claim 1 wherein said apparatus further comprises at least one spacer removably mounted on said shaft between adjacent cutting bits.

4. The apparatus of claim 1 wherein said cutting surface partially faces inwardly toward said base and said inclined surface lies in a plane which is at an angle to the plane of said cutting surface.

5. The apparatus of claim 1 wherein said shaft has a hexagonal cross section and said aperture is configured complementary to said hexagonal cross section.

6. The apparatus of claim 1 wherein said exterior of said shaft is formed as a keyway and said aperture of said base interlocks with said keyway.

7. The apparatus of claim 1 wherein one of said exterior of said shaft and said aperture of said base is formed as a spline, and the other is configured for interlocking with said spline.

8. The apparatus of claim 1 wherein said exterior of said shaft is threaded and said securing means includes a tightening nut cooperatively threaded with said exterior of said shaft.

9. The apparatus of claim 1 wherein said securing means includes a split ring mounted on an end of said shaft.

10. The apparatus of claim 1 wherein said exterior of said shaft and said inner surface of said base are configured for indexing said tool bits about said shaft in a helical cutting path.

11. A rotatable pipe laying apparatus for placing lengths of flexible pipe and cable a distance beneath the surface of the ground comprising:
a hollow shaft having an exterior;
a plurality of cutting bits removably mounted on said shaft, said cutting bits configured for continuous cutting action throughout a full rotation of said shaft, each of said cutting bits having a base and a tool bit, attachment means to removably secure said base to said shaft to prevent rotation of said base about said shaft, said tool bit having a leading cutting edge, a cutting surface extending from said leading edge, and an inclined surface separating said cutting edge and said base; and
means for securing said cutting bits on said shaft, wherein at least one of said cutting bits is mounted on said shaft having said inclined surface facing a first direction, and at least one of said cutting bits is mounted on said shaft having said inclined surface facing oppositely from said first direction.

12. A rotatable pipe laying apparatus for placing lengths of flexible pipe and cable a distance beneath the surface of the ground comprising:
a plurality of cutting bits each having a base and a tool bit spaced outwardly of said base, said tool bit having a leading cutting edge, a frontal surface extending from said leading edge, and a sloped surface extending toward said base at an angle from said frontal surface, said sloped surface lying in a plane which diverges from the plane of said frontal surface;
a shaft having an exterior configured for receiving said cutting bits and for indexing said tool bits about said shaft in a helical cutting path, said exterior and an inner surface of said base geometrically shaped to interconnect together to prevent rotation of said cutting bits about said shaft; each said base being formed with an aperture to slip over said shaft, said tool bit extending outward from said base, and
means for securing said plurality of cutting bits on said shaft.

13. The apparatus of claim 12 wherein said means for securing said plurality of cutting bits comprises at least one non-circular configuration in said base and a complementary non-circular configuration in said shaft.

* * * * *